US007028260B1

(12) United States Patent  
Morsello

(10) Patent No.: US 7,028,260 B1  
(45) Date of Patent: Apr. 11, 2006

(54) TEXT LAYOUT IN PATH CORNER REGIONS

(75) Inventor: Bryce Morsello, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 425 days.

(21) Appl. No.: 10/388,901

(22) Filed: Mar. 14, 2003

(51) Int. Cl.  
*G06F 15/00* (2006.01)

(52) U.S. Cl. ..................... 715/531; 715/517

(58) Field of Classification Search ............... 715/517, 715/518, 531; 400/76; 345/467, 469, 474, 345/471  
See application file for complete search history.

(56) References Cited

U.S. PATENT DOCUMENTS

| | | | |
|---|---|---|---|
| 5,146,552 A | | 9/1992 | Cassorla et al. |
| 5,461,703 A | * | 10/1995 | Goyins et al. ............... 358/1.9 |
| 5,689,717 A | | 11/1997 | Pritt |
| 5,831,632 A | | 11/1998 | Schuster et al. |
| 5,857,212 A | | 1/1999 | Van De Vanter |
| 5,898,439 A | * | 4/1999 | Takazawa .................. 345/441 |
| 6,128,632 A | | 10/2000 | McCully |
| 6,310,622 B1 | | 10/2001 | Asente |
| 6,512,522 B1 | * | 1/2003 | Miller et al. ................ 345/474 |
| 6,522,328 B1 | | 2/2003 | Asente |
| 6,565,610 B1 | * | 5/2003 | Wang et al. ................ 715/517 |
| 6,803,913 B1 | * | 10/2004 | Fushiki et al. ............. 345/467 |
| 2003/0215775 A1 | * | 11/2003 | Bizziocchi ................. 434/178 |

OTHER PUBLICATIONS

Adobe InDesign 2.0 User Guide for Windows and Macintosh, Adobe Systems Incorporated, 2001, San Jose, CA, pp. 111-120, 222-226.  
Aldus IntelliDraw Version 2.0 User Guide, Aldus Corporation, 1993, San Diego, CA, pp. 2-65-2-67.

\* cited by examiner

*Primary Examiner*—Stephen Hong  
*Assistant Examiner*—Manglesh Patel  
(74) *Attorney, Agent, or Firm*—Fish & Richardson P.C.

(57) ABSTRACT

Techniques for placing base and related characters along a path, where the related character is associated with the base character, include determining a position along the path for the base character, the position lying on a segment of the path. An extension of the first segment is defined as extending from and end of the first segment away from the path. The base character is placed at a location corresponding to the position along the path and the related character is placed at a location corresponding to a position along the extension. Placing related characters along the extension maintains a visual relationship between the base and related characters when the base and related characters lie along the path on opposite sides of a corner.

26 Claims, 4 Drawing Sheets

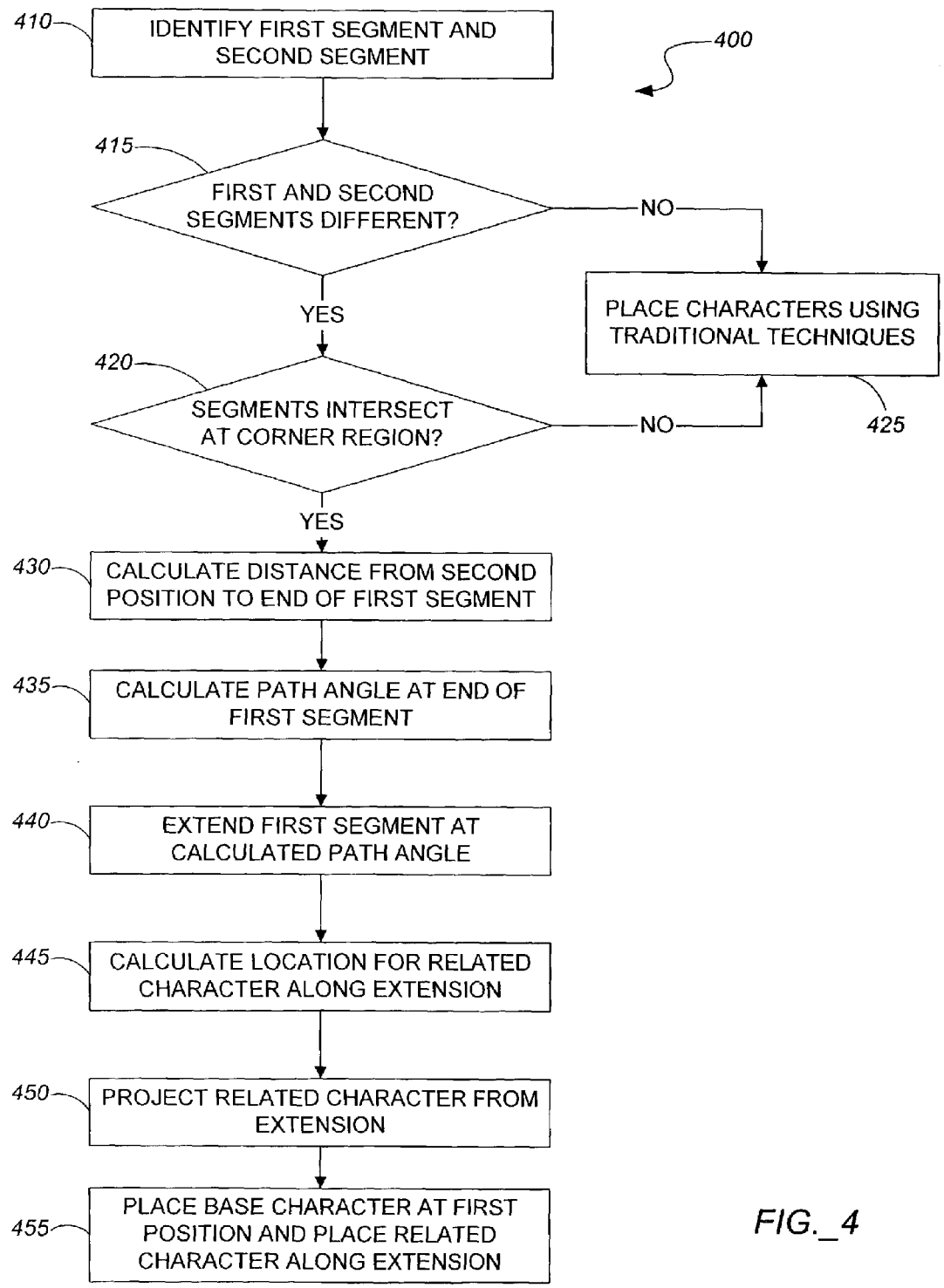
FIG._4

TEXT LAYOUT IN PATH CORNER REGIONS

BACKGROUND

This invention relates to laying out text along a path. Graphic illustration software applications allow users to automate manual graphic design techniques. A software user can create and select images and attributes, then command the software to automatically implement the selections to create an artwork. For example, a user can use an application such as Adobe® Illustrator® graphics illustration software, available from Adobe Systems Incorporated of San Jose, Calif., to create a path of any shape, select graphical images such as glyphs representing text characters, and instruct the application to place the graphical images along the path. The application then determines the proper placement of the graphical images along the path.

FIG. 1 illustrates one application of positioning or laying out text along a path 10 in a typical graphic illustration program. Text typically includes a string or sequence of characters, which are non-divisible abstract symbols that represent a phonetic or pictographic meaning and that can be used as a building block for representing more complex concepts. A glyph is a graphical representation that specifies a visual appearance of the abstract symbol of a character, and typically includes one or more bitmap or vector graphics objects. In this specification, the terms "glyph" and "character" will be used interchangeably to refer to the text representation being laid out along a path. Thus, the text to be laid out includes glyphs, symbols or characters 120, 130 representing characters of text.

The path 10 along which the characters are positioned is a continuous sequence of contiguous points, such as a line or curve. When more than one character of text is laid out along the path 110, all the characters 120, 130 can be of relatively the same font size and projected approximately the same distance from the path 10. Alternatively, the characters of text 120, 130 can be varied in size and distance from the path 10. Regardless of the relative size and position of the characters 120, 130, the characters can be classified as base characters, which are the main or primary glyphs, symbols or characters, and related characters, which are secondary glyphs, symbols or characters that are associated with a base characters and that mark, reference, indicate, or clarify the meaning of or otherwise relate to the base character. Related characters are typically positioned near their respective base character according to a defined spatial relationship. This spatial relationship creates the visual appearance of a grouping of text when characters 120, 130 are displayed. This grouping indicates to a viewer that the base character and its related characters have a logical relationship with one another. Examples of related characters can include adornment characters, such as superscripts, subscripts, footnotes, daggers, asterisks, accents, and Japanese ruby. Related characters 130 are generally positioned to the left or right of, or above or below, their base character.

In the application illustrated in FIG. 1, each character of text 120, 130 is associated with a location along path 110, and is placed at that location along (although not necessarily on) the path 110 in an orientation that is tangent to path 110. In this orientation, the baseline of the characters 120, 130 will typically be parallel to the tangent of the path's curve at the point where the character 120, 130 is located. Thus, characters 120, 130 are laid out to follow the contour of path 110, which can give a visually pleasing image.

The results can be less pleasing, however, when the characters are positioned near a tight curve or corner 140 in the path. As illustrated in FIG. 1, characters 150 and 160 are positioned adjacent to and on opposite sides of corner 140. Rendering these characters in orientations tangent to the path at their respective locations causes the group of characters 150, 160 to appear disjointed when placed along path 110.

SUMMARY

The invention provides computer-implemented techniques for rendering related characters of text along a path while preserving a predetermined relationship between the characters.

In general, in one aspect, the invention features methods and apparatus, including computer program products, for placing first and second characters along a path where the second character is associated with the first character. A first position along the path for a first character is determined. The first position lies on a first segment of the path. An extension of the first segment is defined. The extension extends away from the path from an end of the first segment. The first character is placed at a location corresponding to the first position along the path. The second character is placed at a location corresponding to a position along the extension.

Particular implementations can include one or more of the following features. The first character can be projected from the path. A second position along the path can be determined. The first position can be determined based on a received distance. The second position can be received or determined based on a relationship to the first position, the path, or both. The techniques can include determining whether the first and second segments meet in a corner region. A corner region can be defined as a region of the path that includes a point at which the derivative of the path is discontinuous, or a region of the path over which the derivative of the path changes by an amount greater than a threshold amount. The threshold amount can be defined in response to user input. The corner region can include the meeting of two lines, two curves, or the meeting of a line and a curve. Defining an extension can include defining an extension only if the first and second segments meet in a corner region. The extension can extend the first segment along a straight line at an angle that is calculated at the end of the first segment. The end of the first segment can either be the leading end or the trailing end.

The invention can be implemented to realize one or more of the following advantages. Where a base character and one or more related or adornment characters are separated by a corner region, positioning the related characters along an extension of a path segment that contains the position of a base character preserves the visual relationship between the base character and its related characters during text layout. Maintaining the visual relationship between the characters preserves a meaning of the base character and related characters, which might be lost if the base character and related characters are disjointed. Maintaining the visual relationship between the characters preserves the aesthetic appearance of the image.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 4 is a flow diagram illustrating one implementation according to one aspect of the invention of a method for representing characters along a path.

Like reference symbols in the various drawings indicate like elements.

DETAILED DESCRIPTION

Figure 2:
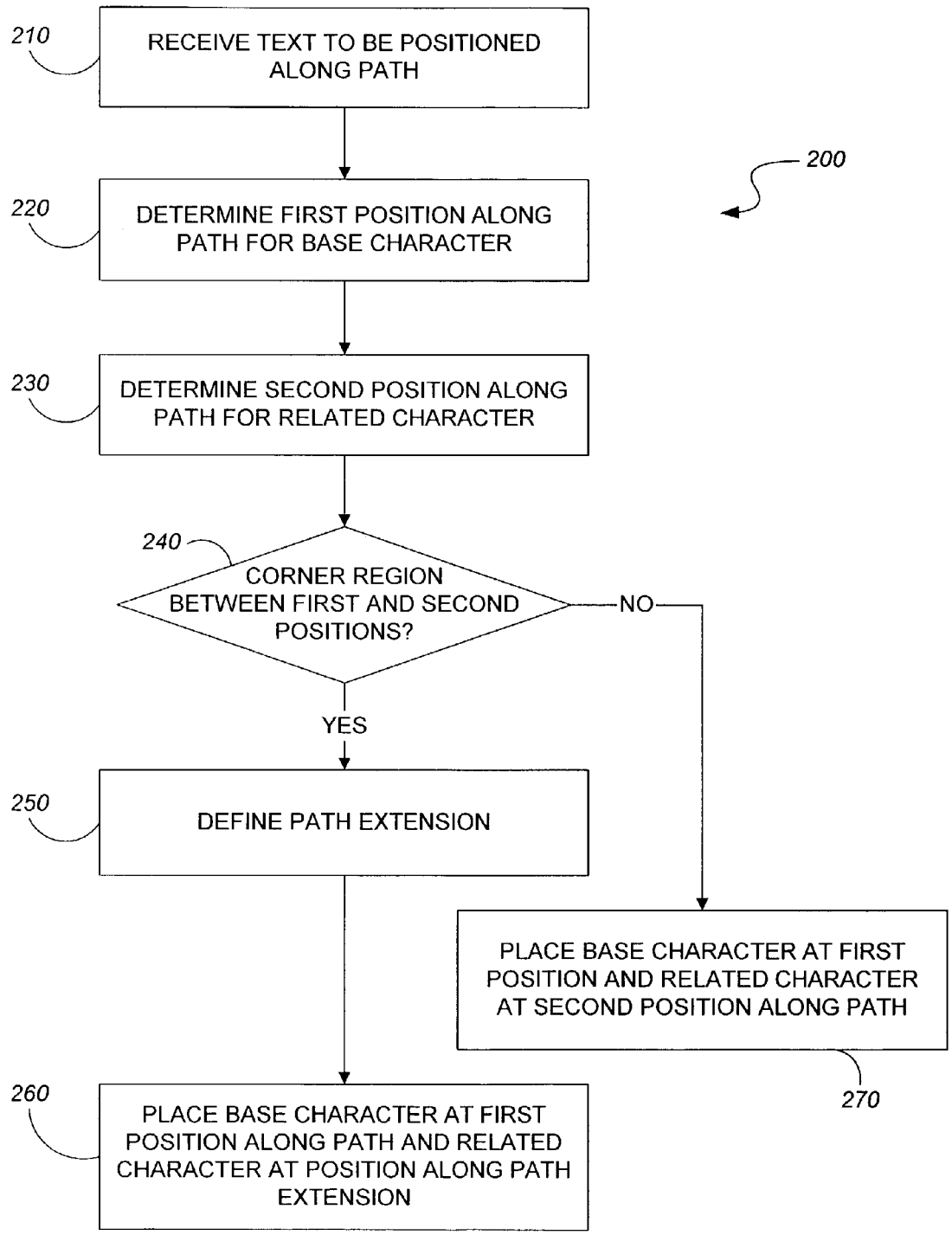
FIG. 2 is a flow diagram illustrating a method of placing characters along a path according to one aspect of the invention.

FIG. 2 illustrates a method 200 of placing characters along a path according to one aspect of the invention. The method can be implemented in a graphical illustration program. The method begins when the graphical illustration program receives a command to position text including a base character and one or more related characters along a path (step 210). The text to be placed along the path can be input by a user using an input device such as a keyboard, or it can be obtained from another source, such as from memory or by copying from a preexisting source. In one example, the base character can be a main or parent character of the text and the related character can be an adornment character.

A first position along the path for the base character is determined (step 220). The first position represents the location along the path at which the base character will be placed, as will be discussed in more detail below, and can be associated with a particular part of the base character, such as the centerline or a particular corner of the base character. The first position can be determined based on a location along the path that is directly or explicitly associated with the base character, such as by user input specifying a location for the base character along the path. Alternatively, the first position can be determined based on a location along the path that is implicitly or indirectly defined—for example, derived from an input specifying an alignment for the text and the path, such as an input specifying that the text to be positioned along the path should be aligned with the left or right end of the path.

A second position along the path for the related character is determined (step 230). The second position represents a location along the path at which the related character would be placed if no corner region separated the base and related characters, as will be discussed in more detail below. Like the first position, the second position can be associated with a particular part of the base character. In particular implementations, the first and second positions are associated with the same part of the base and related characters, respectively. Like the first position, the second position can be determined based on a location along the path that is directly or explicitly associated with the related character, such as by user input specifying a location for the related character along the path. Alternatively, the second position can be determined based on a location along the path that is implicitly or indirectly defined. For example, the second position can be determined based on a location that is derived from both the location of the base character with which the related character is associated and the path. The location of the related character can be derived from the location of the base character according to a predetermined relationship between the related character and its associated base character, which can be defined as an attribute of the related character. The location determination can also account for curvature in the path between the first position and the second position. Thus, the placement of characters along a path that defines a curve can be different from the placement of the same two characters along a path that defines a straight line. In one implementation, the first position and the second position can represent distances from an end of the path.

Figure 1:
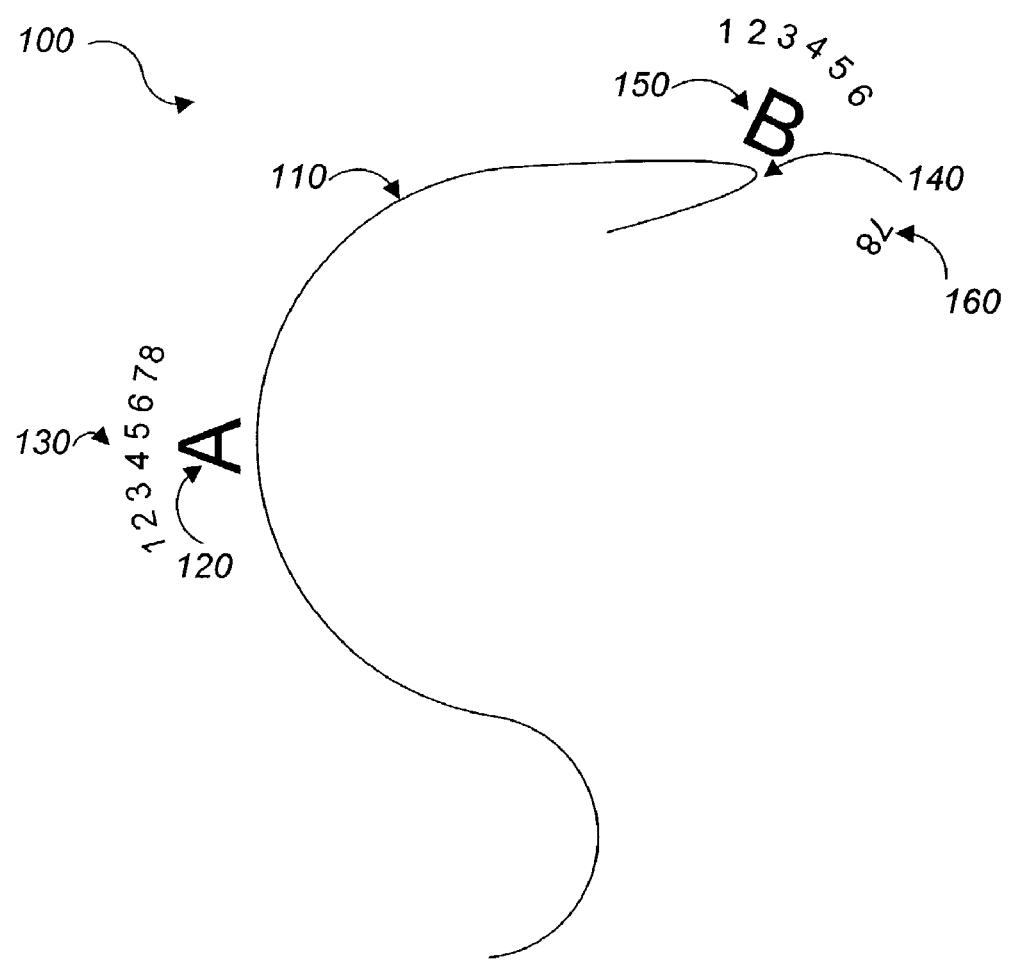
FIG. 1 illustrates the placement of text along a path according to traditional techniques.

Next, a determination is made whether a corner region exists between the first position along the path and the second position along the path (step 240). As used in this specification, a corner region is a region of a path that includes a point at which the derivative of the path is discontinuous, or over which the derivative of the path changes by an amount greater than a threshold amount. Thus, a corner region can be a sharp corner where the derivative of the path is discontinuous (e.g., where the derivative is undefined). In addition, a corner region can be a region of the path that exhibits "corner-like" characteristics, such as tight curve 140 in FIG. 1, over which the derivative of the path changes by more than a specified amount. This amount or threshold can be predefined in a graphical illustration program implementing the method, or it can be defined in response to user input. Thus, a graphical illustration program implementing the method can be configured to allow a user laying out text to determine in advance (or for a particular text object) a degree of curvature that will trigger the application of the text layout techniques described herein. In the event the second position falls directly on a corner, the second position can be shifted a distance along the path to either side of the corner.

If a corner region exists between the first position along the path and the second position along the path (the "YES" branch of step 240), a path extension is defined in the region between the first position and the second position (step 250). The path extension extends the path along its trajectory at a point between the first and second positions to avoid the corner or corner-like characteristics of the corner region. One implementation of a path extension is described in more detail below.

The base character is then placed at the first position along the path and the related character is placed at a position along the extension (step 260). If no corner region exists between the first position along the path and the second position along the path (the "NO" branch of step 240), the base character and the related character can be placed at the first and second positions along the path, respectively, using conventional techniques.

Figure 3:
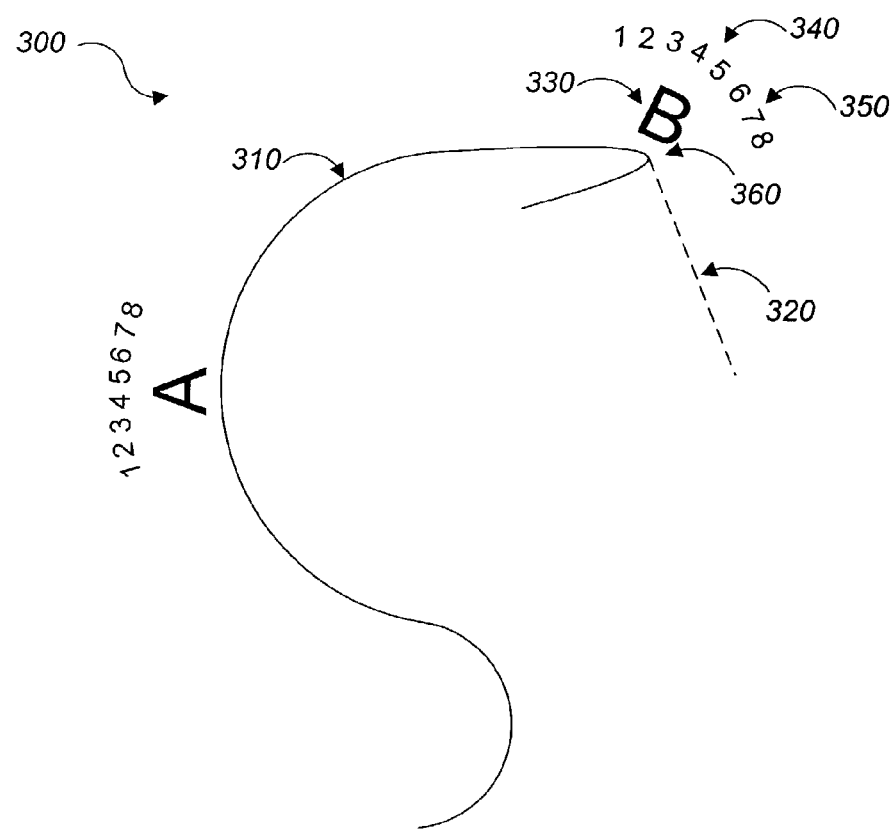
FIG. 3 shows the placement of text along a path according to one aspect of the invention.

By placing the related character along the extension, the relationship between the base and related characters is preserved in the representation, as illustrated in FIG. 3. In FIG. 3, a path extension 320 is defined. A base character 330 and related characters 340 are placed along a path 310 according to the method of FIG. 2 with related characters 350 placed along path extension 320, such that the base character 330 and related characters 340, 350 are kept together, even when the base character 330 and related characters 350 are separated by a corner region, such as corner region 360, of the path 310. This preserves the visual appearance of a relationship between the base character 330 and related characters 340, 350.

FIG. 4 illustrates in more detail one method 400 for placing related characters along an extension of a first segment of a path. The method begins by identifying a first segment and a second segment (step 410). A segment can be any section between two points of the path and will typically extend from one endpoint or corner region of the path to another endpoint or corner region. The first segment is identified as a segment that contains a first position that is associated with a base character (which first position can be the first position identified in step 220, discussed above in the context of FIG. 2). In one implementation, the first segment is identified by identifying consecutive segments of the path, starting at one end of the path, and adding the lengths of each such identified segment together until the cumulative length exceeds a first distance, representing the position of the base character along the path, that is associated with the base character. The first distance for the base character can be specified directly or indirectly, and can be defined based on user input, as discussed above. The first segment is the last segment identified when the cumulative length first exceeds the first distance associated with the base character (i.e., the segment that includes a point along the path that is a distance equal to the first distance the end of the path).

The second segment is identified using similar techniques as a segment that contains a second position that is associated with a character related to the base character (which second position can be the second position identified in step 230, also discussed in connection with FIG. 2, above). In one implementation, the second segment is identified by identifying consecutive segments of the path, starting at the same end of the path as in the preceding step, and adding the lengths of each such identified segment until the cumulative length exceeds a second distance that is associated with the related character. As with the first segment, the second segment is the last segment identified when the cumulative length first exceeds the second distance for the related character (i.e., the segment that includes a point along the path that is a distance equal to the second distance away from the end of the path). Typically, the second segment will be the segment that precedes or follows the first segment on the path.

If the first and second segments are different (i.e., if the first position and the second position lie along different segments of the path) (the "YES" branch of step 415), it is then determined whether the first segment and the second segment intersect at a corner region (step 420). If the first segment and second segment are the same segment (the "NO" branch of step 415), or if the first segment and the second segment are not on different sides of a corner region (the "NO" branch of step 420), the base character and related characters are placed along the path using traditional techniques (step 425), such as those described above in the context of FIG. 1.

If a corner is found between the first and second segments (the "YES" branch of step 420), the distance from the second position to the end of the first segment is calculated (step 430). This distance can be calculated using any conventional technique—for example, by subtracting from the second distance for the related character the cumulative lengths of the segments from the end of the path to and including the first segment. The absolute value of this difference is the distance from the second position to the end of the first segment.

An angle of the path at the end of (i.e., the last point on) the first segment is calculated (step 435). The path angle can be calculated by identifying a line tangent to the path.

Alternatively, if the path defines a curve, an angle of the curve can be calculated by flattening the curve into smaller line segments and computing the angle of the final small line segment. Dividing the rise by the run of the final line segment yields the approximate path angle at the end of the first segment.

The first segment is then extended at the calculated path angle (step 440). The first segment can be extended by defining a straight line segment (an "extension segment") beginning at the last point of the base character's segment (the first segment) and extending at the calculated path angle. Alternatively, the extension segment can begin from a point in the corner region—for example, the point in the corner region that is closest to the base character, or at which the derivative of the curve is the greatest. The extension can be a line of any length, but should at a minimum be long enough to accommodate the placement of the related characters.

A location for the related character along the extension is calculated (step 445), by projecting onto the extension segment the distance from the second position to the end of the first segment (calculated in step 430, above). The related character is projected from the extension segment (step 450) by a third distance associated with the related character, representing the related character's distance from the path, which can be input by a user or derived from attributes of the related character or base character. The base character is then rendered at the calculated location along the extension segment (step 455). The baseline of the related character is oriented parallel to the extension, such that the related character is rendered at the calculated path angle at the end of the first segment. The representation can be displayed or projected on a screen, or printed on media.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A number of embodiments of the invention have been described. Nevertheless, it will be understood that various modifications may be made without departing from the spirit and scope of the invention. For example, the base character and glyph characters can all be characters of the same relative size and importance. Either or both of the base character and the related character(s) can be projected by a Y distance from the path. If the base character and adornment characters are positioned such that the related character would be positioned beyond an end of the path, the techniques described herein can be used to place the related characters along an extension. Accordingly, other embodiments are within the scope of the following claims.

What is claimed is:

1. A computer-implemented method comprising:
   identifying a first position along a path, the first position associated with a location of a base character;
   identifying a second position along the path, the second position associated with a location of a second character related to the base character;
   identifying a first segment, the first segment containing the first position;
   calculating a distance from the second position to an endpoint of the first segment;
   calculating a path angle at a trailing endpoint of the first segment;
   defining an extension of the first segment distinct from the path, the extension extending along a straight line at the path angle from the trailing endpoint of the first segment;
   placing the base character at a location corresponding to the first position along the path; and
   placing the second character at a location corresponding to a position along the extension.

2. The computer-implemented method of claim 1, wherein:
   placing the base character includes placing the base character at a location that is projected from the path.

3. The computer-implemented method of claim 1, wherein:
   identifying a second position includes determining a position relative to the first position.

4. The computer-implemented method of claim 1, wherein:
   identifying a second position includes determining a position relative to the path.

5. The computer-implemented method of claim 1, wherein identifying the first position includes:
   receiving input specifying a first distance from an end of the path; and
   identifying the first segment as a segment that includes a point at the specified first distance from the end of the path.

6. The computer-implemented method of claim 5, wherein identifying the second position includes:
   receiving input specify a second distance from the end of the path; and
   identifying the second segment as a segment including a point at the specified second distance from the end of the path.

7. The computer-implemented method of claim 6, wherein:
   the second position lies on a second segment of the path; and
   defining an extension of the first segment includes:
   determining whether the first segment and the second segment meet at a corner region, the corner region being a region of the path that includes a point at which the derivative of the path is discontinuous, or a region of the path over which the derivative of the path changes by an amount greater than a threshold amount; and
   defining the extension only if the first segment and the second segment meet at a corner region.

8. The computer-implemented method of claim 7, wherein:
   the threshold amount is defined in response to user input.

9. The computer-implemented method of claim 7, wherein:
   the corner region includes a meeting of two lines, a meeting of two curves, or a meeting of a line and a curve.

10. The computer-implemented method of claim 1, wherein:
    the end of the first segment is either a trailing end or a leading end.

11. A computer program product embodied on a machine-readable medium, the computer product comprising instructions operable to cause a computer system to:
    identifying a first position along a path, the first position associated with a location of a base character;
    identify a second position along the path, the second position associated with a location of a second character related to the base character;
    identify a first segment, the first segment containing the first position;
    calculate a distance from the second position to an endpoint of the first segment;
    calculate a path angle at a trailing endpoint of the first segment;
    define an extension of the first segment distinct from the path, the extension extending along a straight line at the path angle from the trailing endpoint of the first segment
    place the base character and the second character, the base character being placed at a location corresponding to the first position along the path and the second character being placed at a location corresponding to a position along the extension.

12. A The computer program product of claim 11, wherein:
    the base character is represented at a location that is projected from the path.

13. A The computer program product of claim 11, wherein:
    the instructions operable to cause a computer system to determine a second position includes instructions operable to cause a computer system to identify a position relative to the first position.

14. A The computer program product of claim 11, wherein the instructions operable to cause a computer system to determine a second position include instructions operable to cause a computer system to:
identify a position relative to the path.

15. A The computer program product of claim 11, wherein the instructions operable to cause a computer system to identify the first position include instructions operable to cause a computer system to:
receive input specifying a first distance from an end of the path; and
identify the first segment as a segment that includes a point at the specified first distance from the end of the path.

16. A The computer program product of claim 15,
wherein the instructions operable to cause a computer system to identify the second position include instructions operable to cause a computer system to:
receive input specifying a second distance from the end of the path; and
identify the second segment as a segment including a point at the specified second distance from the end of the path.

17. The computer program product of claim 16, wherein:
the second position lies on a second segment of the path; and
the instructions operable to cause a computer system to define an extension include:
instructions operable to determine whether the first segment and the second segment meet at a corner region, the corner region being a region of the path that includes a point at which the derivative of the path is discontinuous, or a region of the path over which the derivative of the path changes by an amount greater than a threshold amount; and
instructions operable to define an extension only if the first segment and the second segment meet at a corner region.

18. A The computer program product of claim 17, wherein:
the threshold amount is defined in response to user input.

19. A The computer program product of claim 17, wherein:
the corner region includes a meeting of two lines, a meeting of two curves, or a meeting of a line and a curve.

20. The computer program product of claim 11, wherein:
the end of the first segment is either a trailing end or a leading end.

21. A computer program product embodied on a machine-readable medium, the computer product comprising instructions operable to cause a computer system to:
receive a path;
receive a location of a base character in relation to the path, where a baseline of the base character is parallel to a tangent of the path at the location of the base character;
identify a first segment of the path where the base character is located;
receive a horizontal location of an adornment character in relation to the path, the adornment character adorning the base character;
identify a second segment of the path at the horizontal location of the adornment character;
if the first segment and second segment are not the same segment, determine if the first segment and second segment intersect at a corner region; and
if the first segment and second segment intersect at a corner region;
calculate a first distance from an end of the first segment to the horizontal location of the adornment character,
calculate the angle of the path at a last point on the first segment; and
place the adornment character along a path extension, the path extension beginning at the end of the first segment at the angle of the path.

22. The computer program product of claim 21, wherein the adornment character is a Japanese ruby character.

23. The computer program product of claim 21, wherein the adornment character is at a location above or below the location of the base character.

24. The computer program product of claim 21, wherein the adornment character is placed on the path extension at a distance equal to the horizontal location of the adornment character.

25. The computer-implemented method of claim 1, wherein:
the second character is related to the base character as an adornment character.

26. The computer program product of claim 11, wherein the second character is related to the base character as an adornment character.

* * * * *

UNITED STATES PATENT AND TRADEMARK OFFICE
CERTIFICATE OF CORRECTION

| | |
|---|---|
| PATENT NO. | : 7,028,260 B1 |
| APPLICATION NO. | : 10/388901 |
| DATED | : April 11, 2006 |
| INVENTOR(S) | : Bryce Morsello |

It is certified that error appears in the above-identified patent and that said Letters Patent is hereby corrected as shown below:

Column 7, line 66, Claim 6, delete "specify" and insert --specifying--;
Column 8, line 33, Claim 11, delete "identifying" and insert --identify--.

Signed and Sealed this
Second Day of October, 2012

David J. Kappos
*Director of the United States Patent and Trademark Office*